Patented Apr. 16, 1935

1,997,989

UNITED STATES PATENT OFFICE 1,997,989

METAL POLISH

Heinrich W. Witzel, Ingram, Pa., assignor, by mesne assignments, to American Cyanamid & Chemical Corporation, a corporation of Delaware No Drawing. Application June 22, 1931, Serial No. 546,170

7 Claims. (Cl. 148—22)

This invention relates to metal polishes and methods of preparing them, and more specifically to an improved metal polish employing a new class of active materials.

An object of the invention is to produce a metal polish suitable for the scouring and polishing of metal surfaces such as iron, copper, brass, aluminum, silver, alloys such as pewter, German silver and other decorative preparations as well as plated surfaces such as nickel and chromium plate, and the like. A further object of the invention is to provide a polish having the above named characteristics which makes use of a new class of raw materials hitherto unused for this purpose, thus providing an important outlet for certain by-products. Other objects will appear from the following description and examples.

According to the invention, metal polishes are prepared in which at least a part of the acidity is provided by unsaturated and preferably polybasic organic acid compounds. Maleic acid compounds and their homologues and isomers, such as citraconic acid, fumaric acid, mesaconic acid and the like form the preferred members of this class for use in the present invention, but other unsaturated aliphatic acid substances such as methylene succinic acid, allyl succinic acid and aromatic acids such as phthalic acid are also of value, particularly when used in conjunction with the maleic acid substances. In the present specification the term "unsaturated acid substance" will be used to designate the free unsaturated acids, substituted or unsubstituted, or their acid reacting salts or esters while the term "maleic acid substance" will include substituted or unsubstituted maleic acid or its isomer, fumaric acid, or acid reacting salts or esters of these. Maleic acid compounds which produce an acid reaction during use, either because of hydrolysis or by the action of other ingredients of the composition may also be used and are included under this definition. Free maleic acid or acid maleates are the preferred active substances for use in the preparation of most of the metal polishes of the present invention, but it is to be understood that in its broader aspects the invention is not limited to the use of these substances.

The maleic acid substances may be used alone or in conjunction with other neutral or acid reacting substances such as phthalic acid, benzoic acid, oxalic acid, tartaric acid, or neutral or acid salts of these, and the major portion of the total acidity may or may not be supplied by acid salts or free acids in the composition other than maleic. It is an advantage of the present invention that the full activity of the maleic acid substances is realized irrespective of other organic acids incorporated therewith, for the reason that the acids of this group are the strongest organic acids known.

Maleic acid, which has the following structural formula

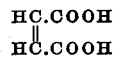

is obtained in its pure state from many sources and may be used as such, but is most readily obtained in admixture with other oxidation products from the vapor phase catalytic oxidation of aromatic and heterocyclic compounds in the presence of oxides of vanadium or other suitable catalysts. Such substances as benzol, phenol, furfural, naphthalene and other organic compounds having the grouping

produce this substance as at least one of the products of such oxidation, and in the case of benzol and phenol it is the main oxidation product, being obtained in admixture with benzoquinone and unoxidized material. When furfural is oxidized, mixtures of maleic and tartaric acids are produced, and it is an advantage of the present invention that such mixtures can be directly used in the preparation of metal polishes.

Maleic acid also appears in large quantities as a by-product from the catalytic oxidation of naphthalene to phthalic anhydride, being obtained in amounts up to 30–40% in the residue or so-called "3-grade product" from the last condenser of the series in which the phthalic anhydride is separated from the converter gases. These residues also contain phthalic anhydride or phthalic acid, which are important materials for use in the present invention, as well as smaller amounts of alphanaphthaquinone, condensation products, and other impurities. This so-called "3-grade product" is a particularly important raw material for use in the preparation of metal polishes, for not only does it contain a high percentage of maleic and phthalic acids which produce, if desired, a high acidity in the product but it also forms a cheap and abundant source of supply. In fact, the present invention forms an important outlet for this product, much of which has hitherto been considered a waste material of no value and difficult to dispose of because of its corrosive properties. For use in the present invention the "3-grade" may be incorporated as such with diluent or absorbent material or the acid values may be strengthened by extracting with water, alkalies such as ammonia, or other suitable solvents and used in the purified state.

The metal polishes are preferably prepared by incorporating inert, absorbent, or abrasive materials with the active constituents, such substances as kieselguhr and other diatomaceous products such as "Celite", "Silocel-3", "Superfloss" and similar materials being of special importance. In cases where too high an absorption is obtained by the use of such porous materials, the product may be diluted with inert or less porous substances such as ground silica barytes, and the like. Similarly, abrasives as sand or carborundum may be incorporated if such properties are desired in the prepared metal polish, as well as detergents such as the ordinary hard or soft soaps.

Inactive materials such as the above may be incorporated with the active constituents in any suitable or preferred manner, for example the dry products may be ground together in a ball mill or other suitable device, with or without the use of a spray of water to prevent formation of a corrosive dust. The dry powder may also be ground between differential rolls as in a flour mill, or the mixture may be formed into a paste and subjected to liquid grinding by means of an edge runner. Similarly, where solutions or suspensions of the active materials are to be used such as are obtained by leaching "3-grade" or the crude coke from the distillation of impure phthalic anhydride, as described in the co-pending application of L. C. Daniels Serial No. 458,917, filed May 31, 1930, such solutions or suspensions may be directly impregnated into the kieselguhr or other absorbent in order to produce the desired product. In all cases, however, the full activity of the strong maleic acid is obtained, which permits the preparation of a metal polish having the desired acidity with much smaller amounts of active material than are necessary than when weaker acids are employed.

The invention will be further illustrated by the following examples, which are for illustrative purposes and to which it is not limited.

*Example 1*

The reaction mixture from the vapor phase oxidation of benzene with air at temperatures of 380–420° C. in the presence of a stabilized vanadium oxide catalyst is condensed at room temperatures, producing a mixture containing 50–65% maleic acid together with benzoquinone and small amounts of unaltered benzene. The mixture so obtained is ground with kieselguhr in such proportions as to obtain a product having a 30–35% acidity figured as maleic acid and the product, when made into a paste with water, forms a highly active metal polish for corroded iron and steel surfaces.

*Example 2*

Maleic acid of commercial purity is treated with sodium hydroxide, sodium carbonate, or the corresponding potassium compounds in quantity just sufficient to form the sodium or potassium acid maleate. 35 parts of the product so obtained are mixed with 13 parts benzoic acid or equivalent amounts of tartaric or oxalic acid and incorporated into 125 parts by weight of kieselguhr, the incorporation being thoroughly effected by grinding in a ball mill. The product so obtained, upon treatment with sufficient water to form a paste, is an excellent polish for the removal of tarnish from silver, pewter, nickel, brass, and similar surfaces, having an acidity of about 10%, figured as maleic acid.

Instead of maleic acid fumaric acid may be used, or substitution products such as citraconic (methyl maleic) acid, mesaconic (methyl fumaric) acid or nitro or chlor substituted maleic or fumaric acids. Detergents may also be incorporated into the polish, such as the ordinary soaps, e. g. potassium stearate or oleate and the like.

*Example 3*

A catalyst is prepared in the following manner:

9.1 parts by weight $V_2O_5$ are added to 20 parts 10N.KOH solution diluted with 83 parts distilled water and a solution of 13.5 parts anhydrous $Fe_2(SO_4)_3$ in 150 parts water is added at temperatures of 60–70° C. The ferric vanadate so formed is filtered off, washed, and suspended in 125 parts water containing 14 parts $K_2SO_4$.

A second suspension is prepared by precipitating a solution containing 23.5 parts $Co(NO_3)_2.6H_2O$

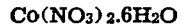

by the addition of 10N.KOH, the precipitate being filtered and washed until no alkalinity appears in the wash water. The cake is then suspended in 150 parts water containing 4 parts KOH.

350 parts pumice stone of 8–12 mesh are heated and sprayed with a mixture of suspension 1 and suspension 2 until a uniform coating is obtained, after which they are filled into a converter supplied with suitable temperature control means and are ready for use.

Vapors of furfural in admixture with methanol or other more readily oxidizable substance in the proportion of 1:4 are admixed with an excess of air and passed over the above described contact mass at temperatures of 370–400° C., the vapors being collected in a heated condenser. The product so obtained contains maleic and tartaric acids in the ratio of 40:60, together with smaller amounts of impurities.

The condenser product may be used directly in the preparation of metal polishes according to the present invention by incorporation with kieselguhr, "Celite" or inert materials, or the acids may be dissolved in alkali and the maleic acid separated as sodium acid maleate in the manner described in my prior application Serial No. 484,707, filed Sept. 26, 1930. The sodium acid maleate so produced with or without the addition of other active materials such as phthalic acid, oxalic acid or benzoic acid may be directly incorporated with absorbent material or the free acid may be liberated by the addition of suitable amounts of mineral acid and the metal polish prepared by absorbing the solution in kieselguhr.

*Example 4*

Naphthalene is oxidized to phthalic anhydride in the vapor phase by well known processes, and the reaction product collected in a series of heated condensers. The product from the last chamber, containing phthalic anhydride, maleic anhydride, together with moisture and smaller amounts of alphanaphthaquinone is known as "3-grade" 50 parts by weight of this substance, which is a hitherto unused by-product in the manufacture of pure phthalic anhydride, are incorporated with 50 parts of kieselguhr, the incorporation being effected by thorough grinding in a ball mill or other suitable grinding apparatus. The product so obtained is an excellent metal polish for iron, copper, brass, aluminum, steel and other industrial materials, and possesses a 33% acidity figured as maleic acid.

Material obtained as a residue from the distillation purification of impure phthalic anhydride may also be incorporated with absorbent material in the same manner, or the active acids may first be leached by treatment with water or alkalies such as ammonium hydroxide, sodium hydroxide, and the like. The salts obtained in this manner may be treated with mineral acid to produce free maleic and phthalic acids or may be incorporated with maleic and phthalic acids obtained from other sources in order to produce the acid salt upon treatment with water, and the mixture incorporated with absorbents as in previous examples.

Example 5

Pure maleic acid, which may be obtained by the leaching of "3-grade" or from the fume towers of a phthalic anhydride plant and purified by the addition of $Na_2CO_3$ to form sodium acid maleate, evaporation and filtration of the solution and liberation with mineral acid, is admixed with three times its weight of kieselguhr or similar diatomaceous product. The admixture is ground in a ball mill until homogeneous and after the addition of water forms an excellent metal polish for corroded iron, steel and other industrial materials. The polish, by reason of its free acidity, is also excellently suitable for cleaning limestone, marble, granite and other stone surfaces, particularly when incorporated with abrasives.

What is claimed as new is:

1. A metal polish containing a substance included in the group consisting of maleic acid and acid salts of maleic acid as an active constituent.

2. A metal polish comprising a substance included in the group consisting of maleic acid and acid salts of maleic acid and a filler.

3. A metal polish comprising a substance included in the group consisting of maleic acid and acid salts of maleic acid and an absorbent filler.

4. A metal polish comprising a substance included in the group consisting of maleic acid and acid salts of maleic acid and a tartaric acid.

5. A metal polish comprising a substance included in the group consisting of maleic acid and acid salts of maleic acid and a phthalic acid.

6. A metal polish comprising maleic acid and phthalic acid as active constituents.

7. A metal polish comprising the reaction product obtained by the catalytic oxidation of vapors of furfural mixed with air, the reaction product being admixed with a filler.

HEINRICH W. WITZEL.